(12) United States Patent
Cakmakci et al.

(10) Patent No.: US 9,086,569 B1
(45) Date of Patent: Jul. 21, 2015

(54) HEAD MOUNTED DISPLAY WITH COLOR CORRECTING DOUBLET EYEPIECE

(71) Applicant: Google Inc., Mountain View, CA (US)

(72) Inventors: Ozan Cakmakci, Sunnyvale, CA (US); Amber M. Luttmann, Fremont, CA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/173,625

(22) Filed: Feb. 5, 2014

(51) Int. Cl.
   *G02B 27/01* (2006.01)

(52) U.S. Cl.
   CPC ........ *G02B 27/0172* (2013.01); *G02B 27/0101* (2013.01); *G02B 27/017* (2013.01)

(58) Field of Classification Search
   CPC .. G02B 27/01; G02B 27/0101; G02B 27/017; G02B 27/0172
   See application file for complete search history.

(56) References Cited

U.S. PATENT DOCUMENTS

| | | | |
|---|---|---|---|
| 5,619,373 A | 4/1997 | Meyerhofer et al. | |
| 6,204,975 B1 | 3/2001 | Watters et al. | |
| 6,400,493 B1 | 6/2002 | Mertz et al. | |
| 6,873,471 B2 * | 3/2005 | Coates et al. | ................. 359/643 |
| 2009/0161225 A1 | 6/2009 | Liu | |

OTHER PUBLICATIONS

Cakmakci, O. et al., "Head-Worn Displays: A Review," Journal of Display Technology, vol. 2, No. 3, Sep. 2006, pp. 199-216, IEEE.
Zheng, Z. et al., "Design and fabrication of an off-axis see-through head-mounted display with an x-y polynomial surface," Applied Optics, vol. 49, Issue 19, pp. 3661-3668 (2010), Optical Society of America. http://dx.doi.org/10.1364/AO.49.003661.

* cited by examiner

*Primary Examiner* — David N Spector
(74) *Attorney, Agent, or Firm* — Blakely Sokoloff Taylor & Zafman LLP

(57) ABSTRACT

An eyepiece for a head mounted display ("HMD") includes a doublet lens that includes a first optical element, a second optical element, and a reflecting element. The first optical element has an entry surface to receive the display light from a micro display and a first coupling surface disposed opposite the entry surface. The first optical element has a first index of refraction and a first Abbe number. The second optical element has an exit surface and a second coupling surface paired to the first coupling surface of the first optical element. The second optical element has approximately the first index of refraction and a second Abbe number different from the first Abbe number. The doublet lens and the reflecting element are configured to direct the display light through the entry surface, the first coupling surface, the second coupling surface, off the reflecting element, and through the exit surface.

20 Claims, 4 Drawing Sheets

HEAD MOUNTED DISPLAY WITH COLOR CORRECTING DOUBLET EYEPIECE

TECHNICAL FIELD

This disclosure relates generally to optics, and in particular but not exclusively, relates to eyepieces for head mounted displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality, the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. In the various applications of using HMDs, it is important to maintain the integrity of the CGI that is directed into the user's eye. Consequently, the optics responsible for directing the CGI light to the user's eye must be designed to deliver a quality image to the user. In some contexts, conventional optics for HMDs are manufactured to color correct for the CGI light.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an eyepiece for a head mounted display ("HMD") are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
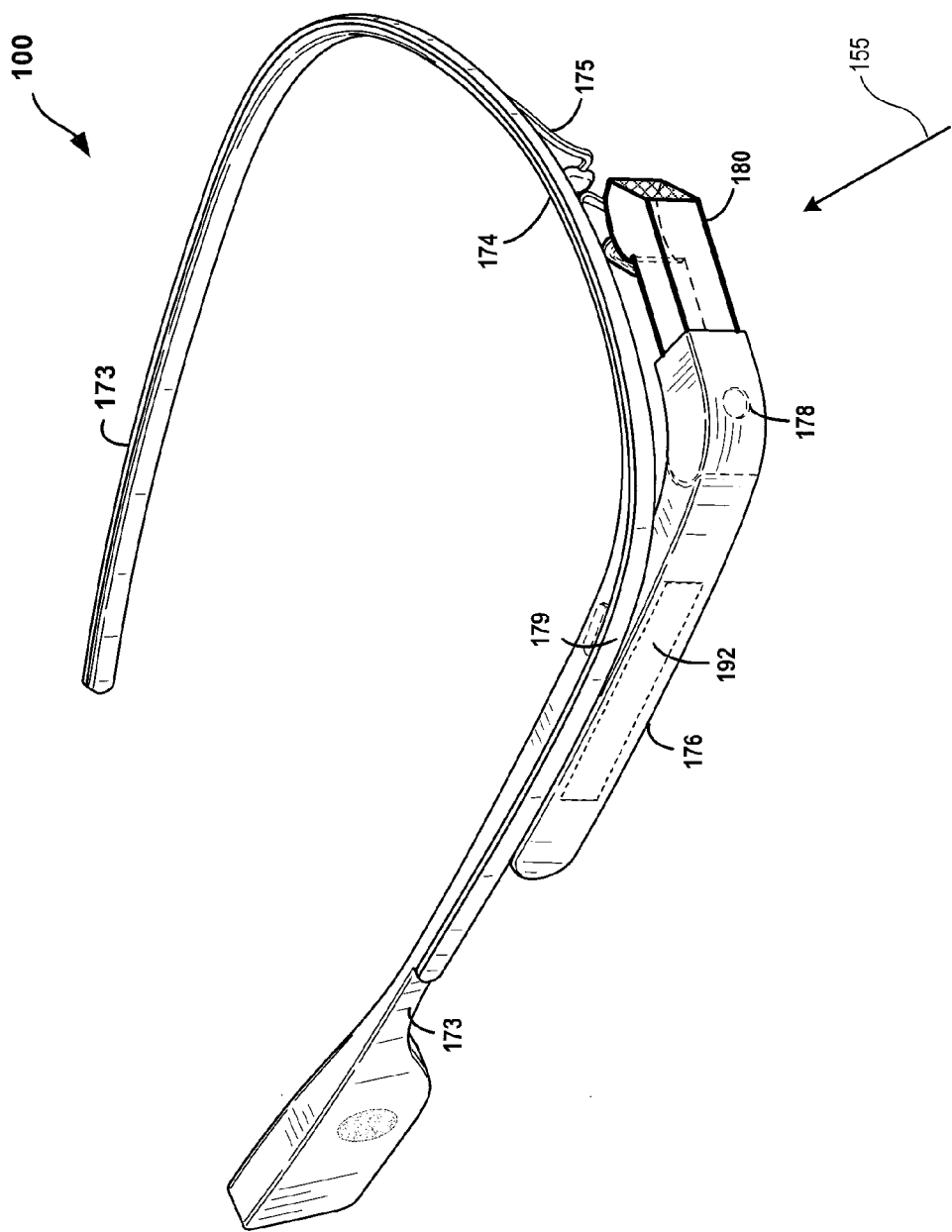
FIG. 1 illustrates a head mounted display ("HMD") including an eyepiece, in accordance with an embodiment of the disclosure.

FIG. 1 illustrates a head mounted display ("HMD") 100 including an eyepiece 180, in accordance with an embodiment of the disclosure. Example HMD 100 is a monocular HMD. HMD 100 includes side-arms 173, a center frame support 174, and a bridge portion with nosepiece 175. In the example embodiment shown in FIG. 1, center frame support 174 connects the side-arms 173. HMD 100 does not include lens-frames containing lens elements in the illustrated embodiment, but other embodiments may include lens elements. An HMD is a display device worn on or about the head. Although FIG. 1 illustrates a specific monocular HMD 100, embodiments of the present invention are applicable to a wide variety of frame types and styles (e.g. visor, headband, goggles).

The illustrated embodiment of HMD 100 is capable of displaying an augmented reality to the user. Eyepiece 180 may permit the user to see a real world image via external scene light 155 in additional to computer generated image ("CGI") display light generated by a micro display within HMD 100. In this case, eyepiece 180 may be referred to as an "optical combiner" because it may present both external scene light 155 and CGI display light to an eye of a user. As a result, the CGI display light may be seen by the user as a virtual image superimposed over the real world as an augmented reality.

HMD 100 may additionally include a component housing 176, which may include an on-board computing system (not shown), an image capture device (digital camera) 178, and a button 179 for operating the image capture device 178 (and/or usable for other purposes). Component housing 176 also includes a touch sensitive touchpad 192 for user's to interact with HMD 100. Component housing 176 may also include other electrical components and/or may be electrically connected to electrical components at other locations within or on the HMD.

Figure 2:
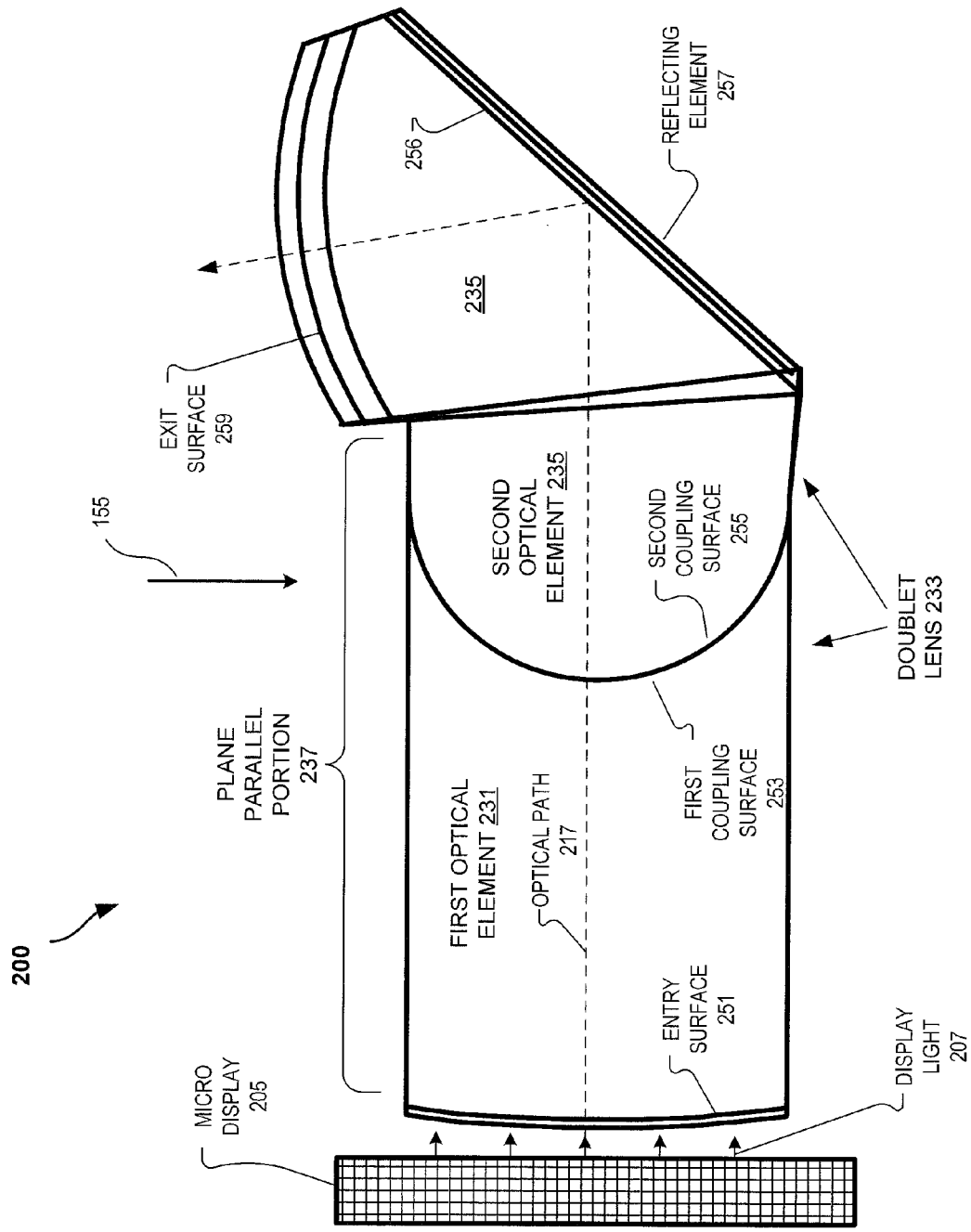
FIG. 2 illustrates a top view of an example eyepiece that directs display light from a micro display in an eyeward direction, in accordance with an embodiment of the disclosure.

FIG. 2 illustrates a top view of an example eyepiece 200 that directs display light 207 from micro display 205 in an eyeward direction, in accordance with an embodiment of the disclosure. Eyepiece 200 is an example eyepiece that could be used as eyepiece 180.

Micro display 205 is housed in component housing 176. Micro display 205 may include a variety of compact technologies such as the various micro displays used in pico-projectors, liquid crystal on silicon ("LCOS") displays, back-lit liquid crystal displays ("LCD"), organic light emitting diode ("OLED") displays, quantum dot displays, light emitting diode ("LED") arrays, or otherwise. In one embodiment, an LCD having 7.5 µm pixels is used.

FIG. 2 shows micro display 205 launching display light toward eyepiece 200. Eyepiece 200 includes doublet lens 233 and reflecting element 257. Doublet lens 233 includes a first optical element 231 and a second optical element 235. Reflecting element 257 is fixed to second optical element 235, in the illustrated embodiment. Reflecting element 257 may be a flat mirror. In one embodiment, reflecting element 257 is a polarized beam splitter ("PBS"). Reflecting element 257 may be partially reflective—reflecting a first percentage of light and passing the remaining percentage.

First optical element 231 includes an entry surface 251 and a first coupling surface 253 that is opposite entry surface 251. Entry surface 251 has a curvature having optical power. In the illustrated embodiment, the curvature of 251 is a spherical surface having negative optical power. In one embodiment, the radius of the curvature is 11.341 mm. In one embodiment, there is an airgap measuring approximately 0.7 mm between entry surface 251 and micro display 205. Although not illustrated, eyepiece 200 may be fixed to component housing 176 to preserve the airgap between micro display 205 and entry surface 251. First optical element 231 may be made of polycarbonate having an Abbe number of 30. First optical element 231 is 10.486 mm thick, in one embodiment.

First coupling surface 253 is a convex surface in the illustrated embodiment. In one embodiment, first coupling surface 253 has a spherical curvature having a radius of 10.344 mm. Second coupling surface 255 is a concave surface in the illustrated embodiment. The curvature of first coupling surface 253 and second coupling surface 255 may be tuned to effect color correction on display light 207 traveling along optical path 217. In the illustrated embodiment, second coupling surface 255 complements first coupling surface 253—closely following first coupling surface 253. An optical cement may be disposed between first coupling surface 253 and second coupling surface 255. The optical cement may be the same index of refraction as the first optical element 231 and the second optical element 235. Eyepiece 200 may significantly reduce the parts count (and thus cost) of conventional eyepieces that have color correction.

Second optical element 235 includes second coupling surface 255 and exit surface 259. In one embodiment, second optical element 235 is 11.341 mm thick. Second optical element 235 may be made of Zeonex Z-E48R having an Abbe number of 56. Although second optical element 235 and first optical element 231 have widely separated Abbe numbers, they have the same index of refraction. Index matching of first optical element 231 and second optical element 235 reduces Fresnel losses as display light 207 propagates through first coupling surface 253 and encounters second coupling surface 255. Index matching of first optical element 231 and second optical element 235 also allows external scene light 155 to propagate through a plane parallel portion 237 of doublet lens 233 without encountering the lensing of doublet lens 233. This allows eyepiece 200 to present a more representative picture of the external world to a wearer of HMD 100.

In refractive materials, Abbe numbers are positive numbers between 20 and 90 that describe a given material's dispersion characteristics. Equation (1) may assist in selecting Abbe numbers to achieve the condition of zero axial color shift in a doublet lens:

$$0 = \frac{P1}{v1} + \frac{P2}{v2}$$

where P1 is the optical power of first optical element 231, P2 is the optical power of second optical element 235, v1 is the Abbe number of the first optical element 231 (e.g. 30), and v2 is the Abbe number (e.g. 56) of second optical element 235. To achieve the zero condition of Equation (1), P1 and P2 must be opposites since Abbe numbers in refractive materials are positive. In FIG. 2, entry surface 251 has negative optical power, which is opposite of exit surface 259, which has positive optical power. Taking into account Equation (1), widely separate abbe numbers (e.g. a difference of 26) in first optical element 231 and second optical element 235 allow for greater design flexibility and larger tolerances with regard to the prescriptions of entry surface 251 and exit surface 259.

Exit surface 259 has a curvature that assists in focusing/collimating display light 207 onto the eye of a wearer of HMD 100. In one embodiment, the prescription for exit surface 259 is given by Equation (2):

$$z = \frac{cr^2}{1 + \sqrt{1 - c^2 r^2 (1+k)}} + Ar^2 + Br^4 + Cr^6 + Dr^8$$

where c represents the base curvature at the vertex, k represents the conic constant, r represents the radius from the optical axis, and A, B, C, and D represent coefficients of aspheric terms, respectively. In one embodiment, A=0, B=−7.951E-5, C=3.36E-7, and D=4.058E-9. The radius of curvature for exit surface 259 is 35.435 mm, in one embodiment. The curvature of exit surface 259 may be defined using other coefficient values.

In operation, micro display 205 launches display light 207 along optical path 217. Display light 207 encounters entry surface 251, first coupling surface 253, optical cement (if any), second coupling surface 255, reflects off of reflecting element 257, and encounters exit surface 259, in that order. Since display light 207 reflects off of reflecting element 257, optical path 217 is considered a "folded optical path." In the illustrated embodiment, second optical element 235 includes a flat plane 256 which reflecting element 257 is fixed to. Flat plane 256 (and therefore reflecting element 257) is positioned to reflect display light 207 through exit surface 259 in an eyeward direction. In the illustrated embodiment, reflecting element 257 is optically positioned to direct display light 207 with a 6° horizontal tilt and a 7° vertical beam tilt. Since FIG. 2 is a top view, only a horizontal tilt is viewable in FIG. 2. Eyepiece 200 may require a downward vertical beam tilt (e.g. 7°) to direct display light 207 into the eye of a wearer of HMD 100 if eyepiece 200 is positioned above an eye of a wearer of HMD 100. Of course, other horizontal and vertical tilt configuration can be utilized to allow for an HMD design that has eyepiece 180 positioned differently (in relation to an eye of a user) than in the illustrated embodiment.

Figure 3:
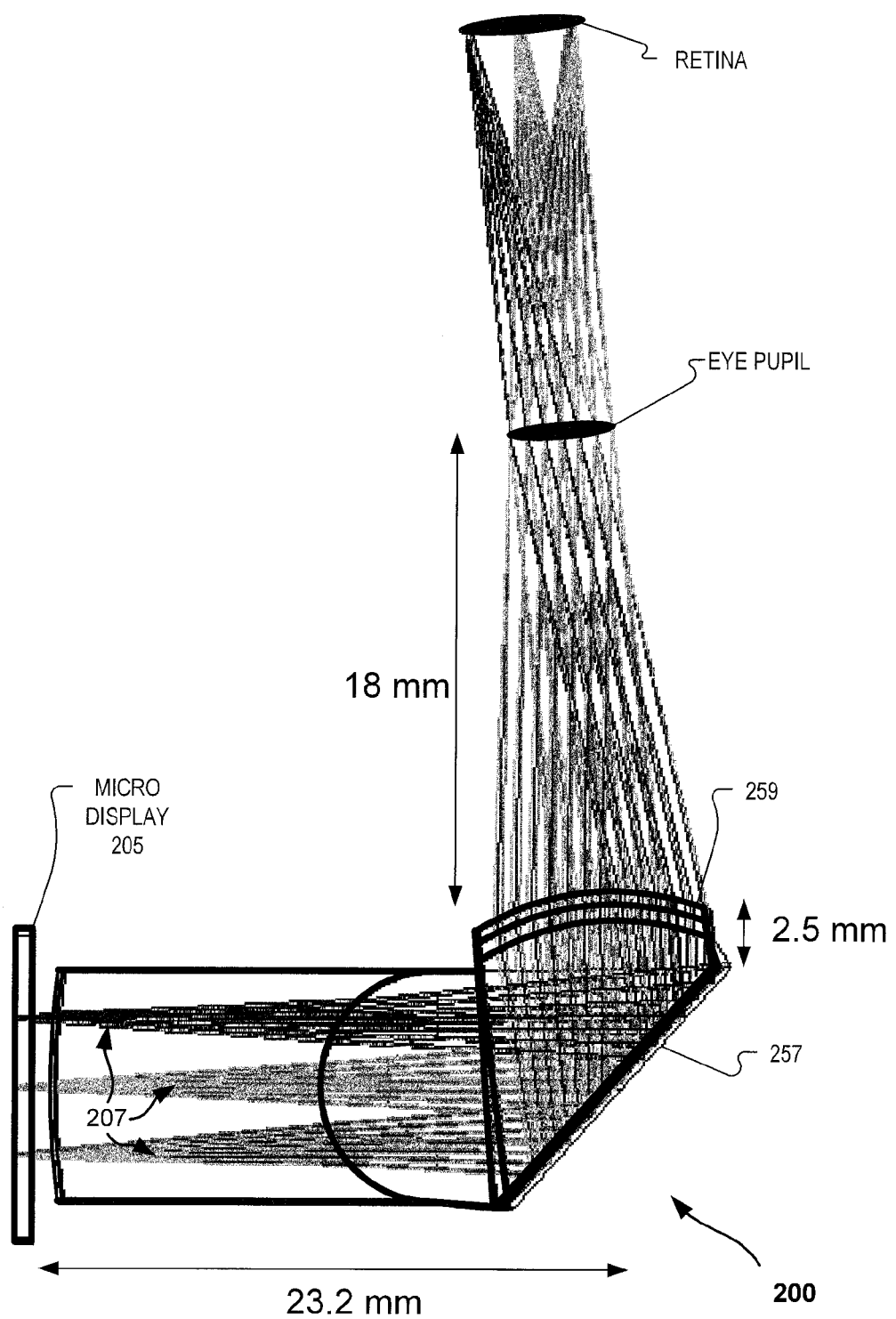
FIG. 3 illustrates a micro display launching display light into an example eyepiece, in accordance with an embodiment of the disclosure.

FIG. 3 illustrates micro display 205 launching display light 207 into eyepiece 200 and eyepiece 200 directing the display light 207 in an eyeward direction, in accordance with an embodiment of the disclosure. FIG. 3 shows that an acceptable distance between a user's eye pupil and exit surface 259 is 18 mm, in one embodiment. A user's eye pupil is assumed to be approximately 4 mm. In FIG. 3, second optical element 235 protrudes 2.5 mm before reaching exit surface 259. The distance from micro display 205 and the middle of reflecting element 257 is 23.2 mm in the illustrated embodiment.

Figure 4:
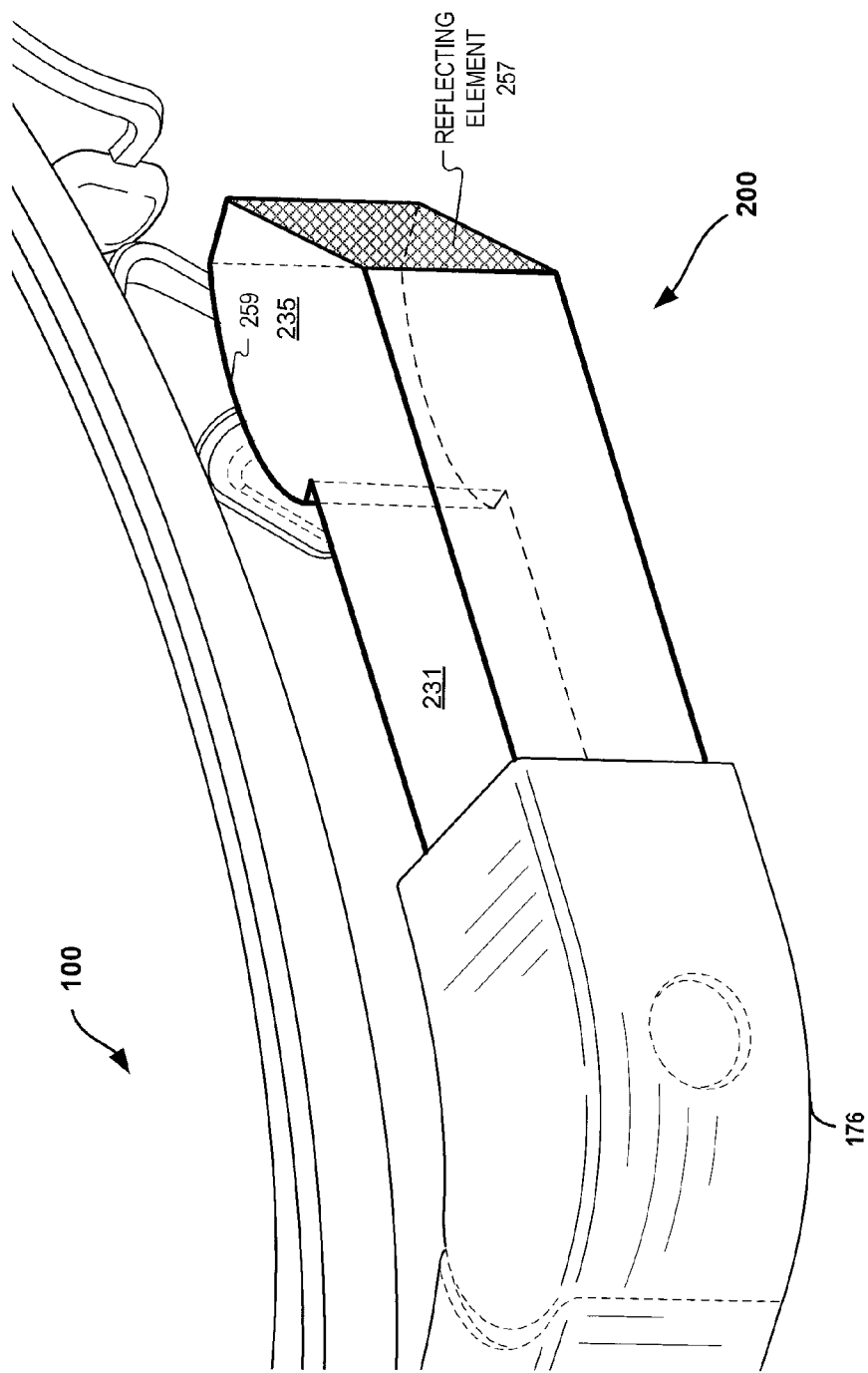
FIG. 4 illustrates a closer view of an example eyepiece coupled to an HMD, in accordance with an embodiment of the disclosure.

FIG. 4 illustrates a closer view of eyepiece 200 on HMD 100, in accordance with an embodiment of the disclosure. FIG. 4 shows that eyepiece 200 includes first optical element 231, second optical element 235, and reflecting element 257. First coupling surface 253 and second coupling surface 255 are not illustrated so as to not obscure the shape of eyepiece 200. Furthermore, it is understood that entry surface 251 is hidden by component housing 176, in FIG. 4.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display ("HMD"), the eyepiece comprising:
    a doublet lens including:
        a first optical element having an entry surface to receive display light from a micro display and a first coupling surface disposed opposite the entry surface, wherein the first optical element has a first index of refraction and a first Abbe number; and
        a second optical element having an exit surface and a second coupling surface paired with the first coupling surface of the first optical element, wherein the second optical element has approximately the first index of refraction and a second Abbe number different from the first Abbe number; and
    a reflecting element, wherein the doublet lens and the reflecting element are configured to direct the display light to propagate along an optical path through the entry surface, through the first coupling surface, through the second coupling surface, reflect off the reflecting element, and propagate through the exit surface in an eyeward direction, in that order.

2. The eyepiece of claim 1, wherein the first coupling surface is a convex surface, and wherein the second coupling surface is a concave surface that complements the convex surface.

3. The eyepiece of claim 1, wherein the entry surface has a first curvature having a first optical power, and wherein the first optical power is a negative optical power.

4. The eyepiece of claim 1, wherein the exit surface has a second curvature having a second optical power, and wherein the second optical power is a positive optical power.

5. The eyepiece of claim 1, wherein the reflecting element is a flat minor having zero optical power.

6. The eyepiece of claim 1, wherein the first optical element includes polycarbonate having the first index of refraction and the first Abbe number, and wherein the second optical element includes E48R having the first index of refraction and the second Abbe number.

7. The eyepiece of claim 1, wherein the first Abbe number and the second Abbe number are widely separate Abbe numbers.

8. The eyepiece of claim 1, wherein the reflecting element is a polarized beam splitter ("PBS").

9. The eyepiece of claim 1, wherein an angle between the display light propagating toward the reflecting element and the display light reflected by the reflecting element is less than ninety degrees.

10. The eyepiece of claim 1, wherein the first coupling surface and the second coupling surface are coupled together with optical cement.

11. A head mounted display ("HMD"), comprising:
    a micro display for launching display light;
    a doublet lens including:
        a first optical element having an entry surface to receive the display light from a micro display and a first coupling surface disposed opposite the entry surface, wherein the first optical element has a first index of refraction and a first Abbe number; and
        a second optical element having an exit surface and a second coupling surface paired with the first coupling surface of the first optical element, wherein the second optical element has approximately the first index of refraction and a second Abbe number different from the first Abbe number; and
    a reflecting element, wherein the doublet lens and the reflecting element are configured to direct the display light to propagate along an optical path through the entry surface, through the first coupling surface, through the second coupling surface, reflect off the reflecting element, and propagate through the exit surface in an eyeward direction, in that order.

12. The HMD of claim 11, wherein the first coupling surface is a convex surface, and wherein the second coupling surface is a concave surface that complements the convex surface.

13. The HMD of claim 11, wherein the entry surface has a first curvature having a first optical power, and wherein the first optical power is a negative optical power.

14. The HMD of claim 11, wherein the exit surface has a second curvature having a second optical power, and wherein the second optical power is a positive optical power.

15. The HMD of claim 11, wherein the reflecting element is a flat mirror having zero optical power.

16. The HMD of claim 11, wherein the first optical element includes polycarbonate having the first index of refraction and the first Abbe number, and wherein the second optical element includes E48R having the first index of refraction and the second Abbe number.

17. The HMD of claim 11, wherein the first Abbe number and the second Abbe number are widely separate Abbe numbers.

18. The HMD of claim 11, wherein the reflecting element is a polarized beam splitter ("PBS").

19. The HMD of claim 11, wherein an angle between the display light propagating toward the reflecting element and the display light reflected by the reflecting element is less than ninety degrees.

20. The HMD of claim 11, wherein the first coupling surface and the second coupling surface are coupled together with optical cement.

* * * * *